Aug. 5, 1958

D. L. RICHTER 2,846,230

PHONOGRAPH RECORD

Filed April 29, 1954

INVENTOR.
Donald L. Richter
BY Morris L. Rabkin
ATTORNEY 2,846,230
Patented Aug. 5, 1958

2,846,230

PHONOGRAPH RECORD

Donald L. Richter, Bellmore, N. Y., assignor to Radio Corporation of America, a corporation of Delaware Application April 29, 1954, Serial No. 426,403
4 Claims. (Cl. 274—42)

This invention relates to disc phonograph records, and more particularly to an improved disc phonograph record having a contoured surface.

In accordance with present day techniques, the quality of music or other material recorded on disc phonograph records is extremely high. When select recording are impressed on such discs, it is of course, desirable that unwanted extraneous noises be held to a minimum to avoid marring the reproduction of the recorded material. It is usual to make such recordings in extremely fine grooves, commonly known as microgrooves. With the extreme fineness of the grooves there is an accompanying fragility. These grooves may be readily damaged by the sliding of the record into and out of the storage sleeve or envelope with which they are supplied. Again, the records may be damaged by the contacting of one grooved surface with another when the records are stacked as on an automatic record changer.

It is accordingly an object of the present invention to provide an improved phonograph record which obviates the foregoing difficulties.

It is another object of this invention to provide an improved phonograph record as set forth wherein means are provided for preventing contacting of the grooved areas of adjacent stacked records.

It is a further object of this invention to provide an improved phonograph record as set forth wherein the record is lighter in weight, practical and economical of manufacture.

In accomplishing these and other objects, there has been provided in accordance with the present invention a phonograph record having a central or label area of uniform standard thickness surrounded by a record groove area. The record groove area is of a thickness less than that of the label area and tapered progressively thinner from immediately adjacent the label area to a minimum thickness at the periphery of the grooved area. Surrounding the grooved area is a marginal area which is of a thickness less than that of the thickness of the label area but greater than the average thickness of the grooved area.

Figure 1:
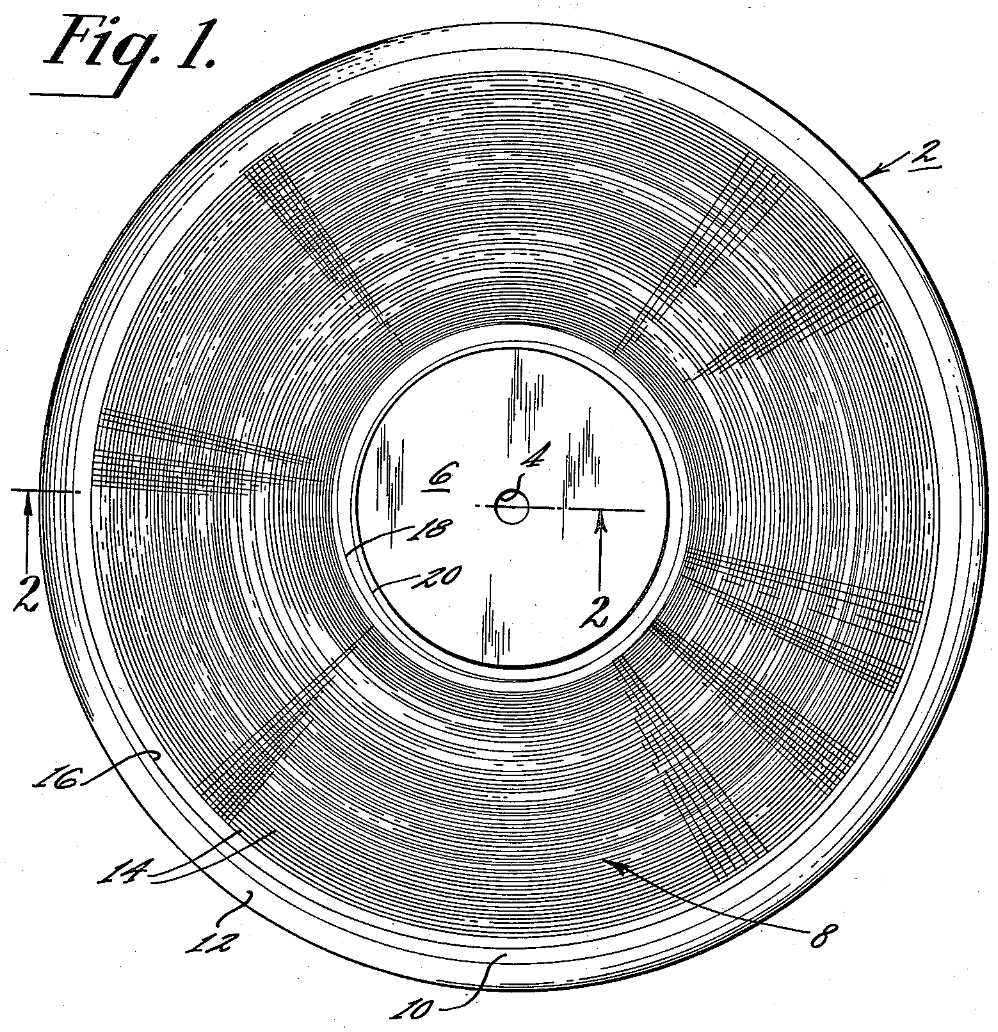
Figure 2:
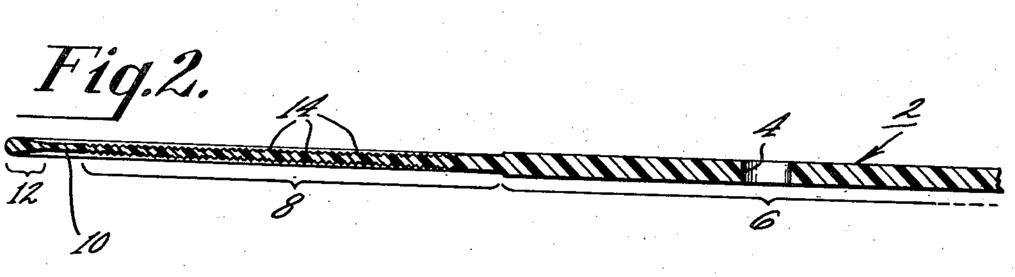

An understanding of the invention may be had from the following detailed description of an illustrative embodiment when read in connection with the accompanying drawing in which:

Fig. 1 is a plan view of the phonograph record made in accordance with the present invention; and Fig. 2 is a sectional fragmentary view drawn to an enlarged scale, the section being taken along the line 2—2 of Fig. 1 as viewed in the direction of the arrows.

Referring now to the drawing in more detail, there is shown in Figs. 1 and 2 a phonograph record 2. The phonograph record 2 is provided with a central spindle hole 4 which, in turn, is surrounded by an area which may be referred to as the label area 6. The label area 6 of the phonograph record is substantially flat with the opposite faces parallel. The thickness of the phonograph record 2 at the label area is of standard thickness which is the thickness for which automatic record changers have been designed. This thickness may, for example, be .075″. Surrounding the label area 6, there is a record groove area 8. The record groove area 8 has a maximum thickness immediately adjacent the label area 6. This maximum thickness is slightly less than the thickness of the record 2 at the label area 6. For example, the thickness of the record groove area 8 at its point of maximum thickness may be .065″. This record groove area 8 tapers from the maximum thickness aforesaid to a minimum thickness at the outer periphery 10 of the record groove area 8. The thickness of the record at the region of minimum thickness may, for example, be about .045″. Surrounding the record groove area 8, there is a marginal area 12. The marginal area or portion 12 has a maximum thickness greater than the average thickness of the record groove area 8 but less than the thickness of the label area 6. The thickness of the marginal area 12 may, for example, be of a thickness corresponding to the accepted standard thickness for the rim of phonograph records, whereby the record may be used with automatic record changers of the type wherein the selection of the records is affected at the rim of the record. This thickness may, for example, be .065″. It is of course to be understood that a record made in accordance with the foregoing description will be symmetrical about a median plane drawn through the center of the record 2 parallel to the planes defined by the surfaces of the label area 6.

The groove area of the record carries a record groove 14. The record groove 14 includes a usual lead-in groove 16, a lead-out groove 18, and a terminating eccentric circle 20. The terminating circle 20 lies adjacent the periphery of the circle defined by the label area, and is of a diameter substantially greater than the diameter of the label area. The eccentricity of the terminating circle is less than the difference between the diameter of the terminating circle 20 and the diameter of the label area 6. In this manner, the terminating circle 20 lies entirely within the record groove area and never encroaches upon the label area.

Having thus described the present invention, what is claimed is:

1. A disc phonograph record comprising a tablet having a central spindle hole, a label area immediately surrounding the spindle hole which is flat with opposite faces parallel and being of a predetermined thickness, a record groove area surrounding said lable area, said record groove area being tapered progressively thinner from a maximum thickness immediately adjacent said label area of a thickness slightly less than the thickness of said label area to a minimum thickness at the outer periphery of the record groove area, and a marginal portion surrounding the outer periphery of said record groove area, said marginal portion having a thickness greater than the average thickness of said record groove area but less than the thickness of said label area.

2. A disc phonograph record comprising a tablet having a central label area, said label area being substantially flat with opposite faces parallel and of predetermined thickness, a record groove area surrounding said label area, said record groove area being of a maximum thickness immediately adjacent said label and tapering radially to a minmium thickness at the outer periphery of said groove area, said maximum thickness being slightly less than the thickness of said label area, and a marginal portion surrounding said record groove area, said marginal portion having a thickness greater than the average thickness of said record groove area but less than the thickness of said label area.

3. A disc phonograph record comprising a tablet having a central spindle hole, a label area immediately surrounding the spindle hole which is flat with opposite faces parallel and being of a predetermined thickness, a record groove area surrounding said label area, said record groove area being tapered progressively thinner from a maximum thickness substantially the same as the thickness of said label area immediately adjacent said label area to a minimum thickness at the outer periphery of the record groove area, and a marginal portion surrounding the outer periphery of said record groove area, said marginal portion having a thickness greater than the average thickness of said record groove area but less than the thickness of said label area.

4. A disc phonograph record comprising a tablet having a central label area, said label area being substantially flat with opposite faces parallel and of predetermined thickness, a record groove area surrounding said label area, said record groove area being of a maximum thickness substantially the same as the thickness of said label area immediately adjacent said label and tapering radially to a minimum thickness at the outer periphery of said grooved area, and a marginal portion surrounding said record groove area, said marginal portion having a thickness greater than the average thickness of said record groove area but not greater than the thickness of said label area, said groove area having a record groove impressed thereon, said record groove terminating in an eccentric circular terminating groove having a diameter greater than the diameter of said label area, the eccentricity of said terminating circle being less than the difference between the diameter of the circle and of the label area.

References Cited in the file of this patent

UNITED STATES PATENTS

| | | |
|---|---|---|
| 825,065 | Maitre | July 3, 1906 |
| 2,503,609 | Barnhart | Apr. 11, 1950 |
| 2,631,859 | Ellsworth | Mar. 17, 1953 |

FOREIGN PATENTS

| | | |
|---|---|---|
| 8,122 | Great Britain | Aug. 26, 1909 |
| 124,508 | Austria | Sept. 25, 1931 |
| 227,581 | Germany | Oct. 16, 1924 |